United States Patent [19]

Zenker

[11] Patent Number: 4,719,796
[45] Date of Patent: Jan. 19, 1988

[54] METHOD AND APPARATUS FOR TESTING A VEHICLE ANTI-SKID BRAKE SYSTEM

[75] Inventor: Richard L. Zenker, Grosse Pointe Woods, Mich.

[73] Assignee: Kelsey-Hayes Co., Romulus, Mich.

[21] Appl. No.: 7,022

[22] Filed: Jan. 27, 1987

[51] Int. Cl.⁴ .................................................. G01L 5/28
[52] U.S. Cl. ........................................................ 73/121
[58] Field of Search .................... 73/39, 121, 128, 129, 73/714; 364/550

[56] References Cited

U.S. PATENT DOCUMENTS

| | | | |
|---|---|---|---|
| 3,866,980 | 2/1975 | Eisele et al. ............................ | 303/92 |
| 4,192,180 | 3/1980 | Gerstenmeier et al. ............... | 73/121 |
| 4,389,710 | 6/1983 | Rasmussen ............................ | 364/551 |
| 4,440,015 | 4/1984 | Hann ..................................... | 73/121 |
| 4,520,663 | 6/1985 | Moore et al. .......................... | 73/129 |
| 4,653,815 | 3/1987 | Agarwal et al. ...................... | 303/100 |

Primary Examiner—Stewart J. Levy
Assistant Examiner—Robert R. Raevis
Attorney, Agent, or Firm—Ralph J. Skinkiss; Mark J. Sobanski

[57] ABSTRACT

A method and apparatus for verifying proper operation of a vehicle anti-lock braking system includes pressure measuring devices which are releasably attached to an exterior surface portion of the flexible wheel brake hoses. Each measuring device senses changes in the external diameter of the associated hose, which changes are representative of fluid pressure changes within the hose. The valving in the braking system is tested by applying fluid pressure to the system, operating the associated valves in a predetermined sequence, and monitoring the pressure changes in the associated wheel brake hoses to determine whether the valving is operating properly.

10 Claims, 12 Drawing Figures

METHOD AND APPARATUS FOR TESTING A VEHICLE ANTI-SKID BRAKE SYSTEM

BACKGROUND OF THE INVENTION

The present invention relates to a method and apparatus for testing a fluidically operated system wherein pressurized fluid is transmitted through conduits and associated valve means to actuate at least one fluid responsive mechanism. More particularly, the present invention concerns a method of testing the operation of the valving in a vehicle anti-skid brake system, without interrupting the hydraulic brake lines.

The use of anti-skid brake systems in vehicles is becoming increasing popular. Under adverse braking conditions, an anti-skid braking system not only improves the braking ability, but also improves the steerability of the vehicle. Typically, an anti-skid braking system includes a central electronic control unit connected to one or more wheel speed sensors for monitoring the wheel speed. The central control unit is connected to operate one or more electrically-actuated valves in the hydraulic braking circuit. Upon sensing an incipient wheel lock-up condition during braking, the control unit operates the valves to control the application of pressurized brake fluid to the selected wheel brakes to correct or prevent a wheel lock-up condition.

With the increasing popularity of anti-skid braking systems, there is a need for suitable diagnostic and trouble shooting equipment. For example, although an electrical connection between the central control unit and a given valve can be monitored to check whether the central control unit is sending the proper control signal to the proper valve, the transmission of such a control signal does not necessarily indicate that the mechanical components of the valve are operating properly.

SUMMARY OF THE PRESENT INVENTION

The present invention relates to a method and apparatus for testing a vehicle anti-skid brake system to insure that the appropriate hydraulic valves in the system are properly responding to the respective control signals. In the method of the present invention, the brake fluid pressure in a portion of the brake line located between the valve to be tested and the selected wheel brake is sensed. Next, pressurized brake fluid is transmitted to the selected wheel brake through the valve, such as by depressing the vehicle brake pedal. The valve is then operated in a predetermined sequence as controlled by the central controller and, simultaneously, the pressure being sensed is monitored to determine whether the particular valve is operating properly.

In accordance with the present invention, a unique pressure measuring device is utilized to sense the fluid pressure in the associated brake line. The measuring device is isolated from direct contact with the fluid within the brake line during the sensing operation, and thus it is not necessary to interrupt the brake line.

More specifically, the device includes clamping means engageable with the exterior surface of the brake line. The clamping means includes a portion which is deflectable in response to changes in the exterior dimension of the sensed brake line, dimensional change representative of the fluid pressure change in the line. Sensing means is coupled to the deflectable portion for generating a signal in response to the change in fluid pressure within the brake line.

In the preferred embodiment of the invention, the clamping means includes means for releasably attaching the device to the brake line, and means for adjusting the clamping force with which the clamping means engages the exterior surface portion of the brake line. Preferably, the measuring device is attached to a flexible brake hose which is typically provided at each wheel location to connect the metallic brake line to the selected wheel brake.

In the preferred method of the present invention, a separate pressure measuring device is typically connected to each flexible wheel brake hose which supplies hydraulic pressure to a wheel brake controlled by the on board central control unit. While an operator can utilize a hand held meter to individually monitor the controlled application of pressure to the associated wheel, a diagnostic computer may also be utilized. In these instances, the output of each brake line pressure measuring device may be connected to the diagnostic computer, and the diagnostic computer may communicate with the on board vehicle central control unit. The central control unit can be programmed with a predetermined diagnostic routine for operating the associated valving in a predetermined sequence, while fluid pressure is applied to the system by depressing the vehicle brake pedal. During this time, the actual fluid pressure is applied to the selected wheel brakes is monitored by the diagnostic computer to determine whether the anti-skid breaking system is operating properly. With the present invention, the proper operation of the valving of the anti-skid control system can be confirmed without interrupting the associated brake lines.

The above, as well as other advantages and features of the invention, will become readily apparent to one skilled in the art from reading the following detailed description of the preferred embodiments of the invention in conjunction with the attached drawings.

DETAILED DESCRIPTION OF THE PREFERRED EMBODIMENTS

Figure 1:
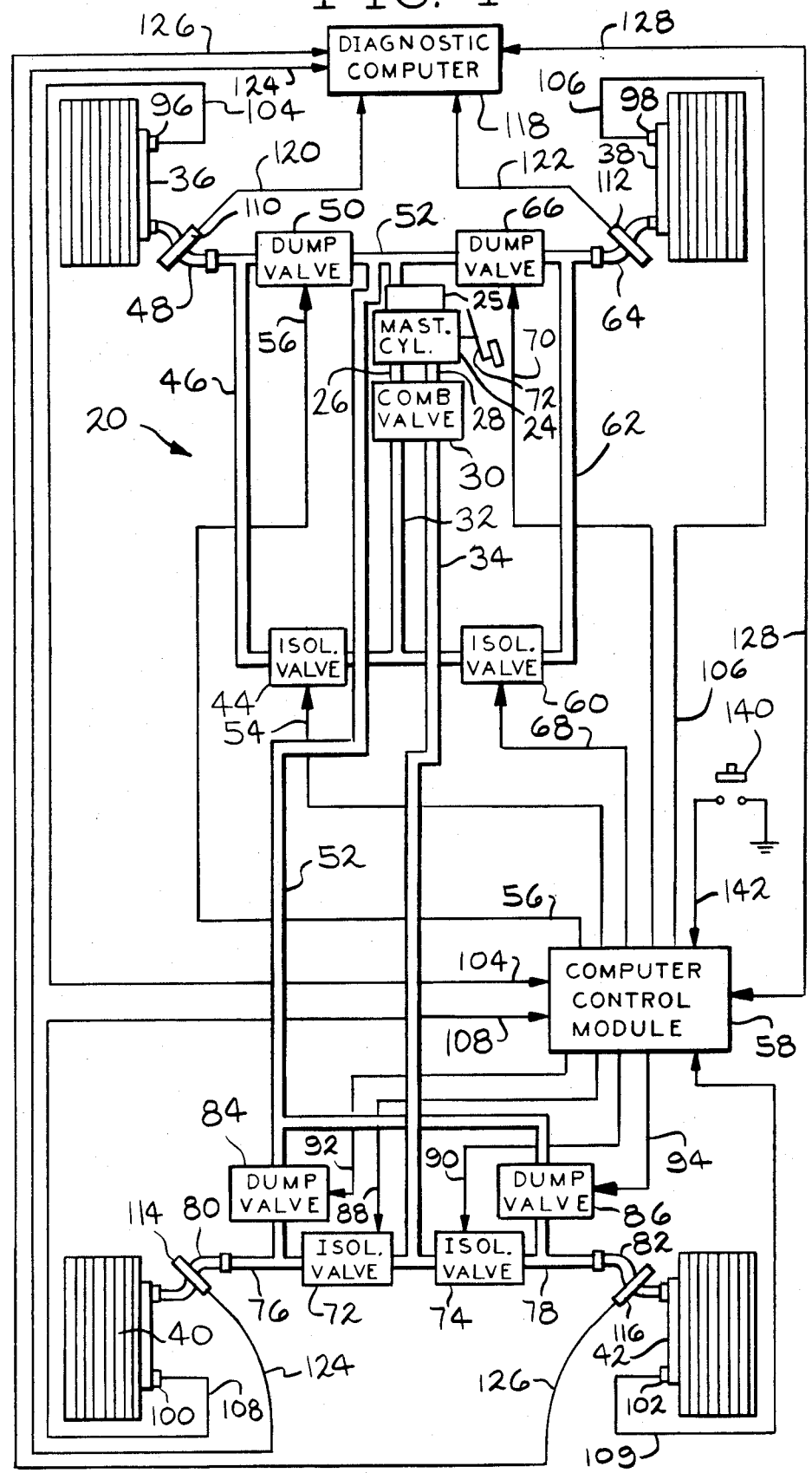
FIG. 1 is a schematic illustration of a vehicle provided with an anti-skid braking system, shown in connection with diagnostic computer, and having pressure sensors according to the present invention connected to the flexible wheel brake hoses.
Figure 2:
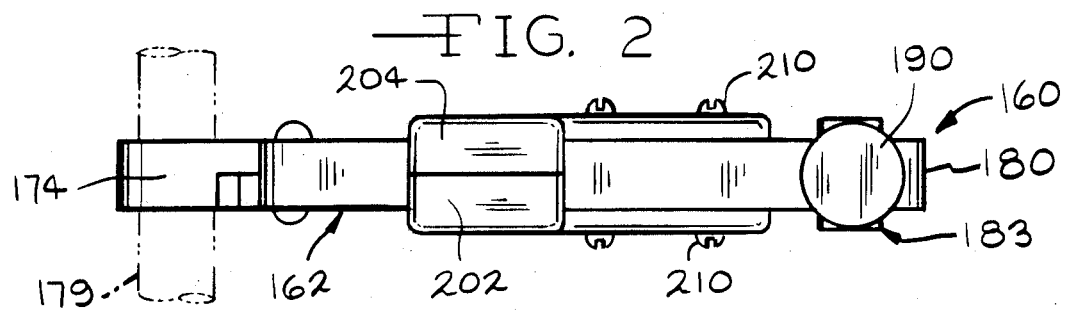
FIG. 2 is a top elevational view of a preferred embodiment of a pressure measuring device according to the invention, shown disposed about a fluid carrying conduit.

Referring to FIG. 1, there is shown a schematic diagram illustrating an example of one type of anti-skid control system 20 which can be tested by means of the method and apparatus of the present invention. As shown in FIG. 1, the anti-skid control system 20 is installed on a vehicle having a hydraulic braking system consisting of a brake pedal 22 coupled to operate a master cylinder 24 having a brake fluid reservoir 25. When the vehicle operator depresses brake pedal 22, the master cylinder 24 supplies hydraulic fluid under pressure in separate hydraulic brake lines 26 and 28 to a conventional combination valve 30. The combination valve 30 includes a first output line 32 for supplying hydraulic fluid at a first predetermined pressure to actuate one set of wheel brakes, and a second output line 34 for supplying fluid at a second predetermined pressure to actuate a second set of wheel brakes.

In the anti-skid control system illustrated in FIG. 1, each of four wheel brakes 36, 38, 40, and 42 are adapted to be controlled by the anti-skid control system. The fluid pressure in the output line 32 of the combination valve 30 is supplied through specific valving to actuate the wheel brakes 36 and 38, while the fluid pressure in the combination valve output line 34 is supplied through similar valving to actuate the wheel brakes 40 and 42. In particular, the fluid pressure in the line 32 is supplied to the wheel brake 36 through a normally open isolation valve 44, a conventional metallic brake line 46, and a conventional flexible wheel brake hose 48, which is typically constructed of rubber or a similar synthetic material. A normally closed dump valve 50 is connected between the line 46 and a line 52 which returns fluid to the fluid reservoir 25 of the master cylinder 24. Under normal braking conditions, the isolation valve 44 is open and the dump valve is closed such that the fluid pressure in the line 32 is supplied directly to the wheel brake 36. The isolation valve 44 and the dump valve 50 receive control signals on lines 54 and 56 respectively from an on-board computer control module 58.

In a similar manner, fluid pressure in the line 32 is also supplied to the wheel brake 38 through a normally open isolation valve 60, a metallic brake line 62, and a flexible wheel brake hose 64. A normally closed dump valve 66 is connected between the line 62 and the line 52. The isolation valve 60 and the dump valve 66 receive control signals on lines 68 and 70 respectively from the computer control module 58.

The wheel brakes 40 and 42 are actuated via the pressure in the line 34 in a similar manner. More specifically, the fluid pressure in the line 34 is supplied through normally open isolation valves 72 and 74, metallic brake lines 76 and 78, and flexible wheel brake hoses 80 and 82 to actuate wheel brakes 40 to 42 respectively. A normally closed dump valve 84 is connected between the line 76 and the line 52, while a normally closed dump valve 86 is connected between the line 78 and the line 52. The valves 72, 74, 84, and 86 receive control signals on lines 88, 90, 92, and 94 respectively from the computer control module 58.

In the anti-skid control system illustrated in FIG. 1, a separate wheel speed sensor is connected to each controlled wheel and is connected to provide a wheel speed signal to the computer control module. More specifically, the wheels associated with the wheel brakes 36, 38, 40, and 42 are provided with wheel speed sensors 96, 98, 100, and 102 which generate wheel speed signals to the computer control module 58 on lines 104, 106, 108, and 109, respectively.

As previously mentioned, under normal braking conditions, the isolation valves are open and the dump valves are closed such that the pressurized fluid from the master cylinder is supplied directly to each of the wheel brakes through the combination valve 30. During braking, the computer control module 58 monitors the wheel speed of each controlled wheel. When an incipient wheel lock-up condition is detected at any particular wheel, the control module 58 is operable to selectively close the isolation valve associated with that particular wheel to prevent further increase in brake pressure to the wheel and, if necessary, selectively open the associated dump valve to reduce a lock-up condition of the wheel. After a wheel lock-up condition has been corrected, the computer control module can selectively open the isolation valve to selectively increase fluid pressure to the selected wheel brake and provide further braking of the associated wheel.

It will be appreciated, from the following discussion of the present invention, that the present invention is not limited to the testing of any particular type of anti-lock braking system and that, the number of valves, lines, and sensors may be reduced or increased from those shown in FIG. 1. For instance, anti-lock braking may be applied to wheels in diagonally opposed pairs, or to only two wheels of a four-wheeled vehicle, or to both wheels on a common axle simultaneously with the remaining two wheels having separate anti-lock provisions. Also, while the illustration in FIG. 1 shows an anti-lock braking system in which braking pressure is provided solely by a conventional master cylinder, the invention is equally applicable to a system which develop braking pressure with the use of a separate pump. Further, while the dump valves shown in FIG. 1 are connected to return fluid to the master cylinder reservoir, the dump valves could, alternatively, be connected to dump the fluid to a separate accumulator (not shown).

In accordance with the present invention, the operation of the vehicle brake system 20 is tested by releasably attaching a separate pressure sensing device in the portion of the brake circuit located between each controlled wheel brake and the associated valving. As will be discussed, the pressure measuring device of the present invention includes a portion which is deflectable in response to changes in the exterior diameter of the brake line, which in turn is representative of the pressure within the brake line. As pressure is then applied to the system (by depressing the vehicle brake pedal), the associated valving is actuated in a predetermined sequence while, simultaneously, the sensed pressures can be monitored to determine whether the valving is operating properly.

In FIG. 1, pressure sensing devices 110, 112, 114, and 116 are releasably attached to the exterior portion of the wheel brake hoses 48, 64, 80 and 82 respectively. The measuring devices 110, 112, 114, and 116 are shown connected to a readout device, which may be a diagnostic computer 118, by respective electrical lines 120, 122, 124, and 126. The diagnostic computer 118 can be connected to communicate with the computer control module 58 via lines 128. A push button switch 140 is shown connected by a line 142 to ground an input terminal of the computer control module 86 to cause it to initiate a diagnostic routine.

As will appear more fully below, applicant's pressure sensing devices make use of strain gauges preferably connected in a bridge circuit and measured with a device such as a conventional bridge-amplifier-meter (BAM). For an automated test system, a plurality of bridge-amplifier-meter circuits would be included in a diagnostic computer as input terminal devices. For testing a single wheel circuit, a hand-held unit with internal shunt calibration and bridge completion circuitry is available under the tradename Micro-Epsilon 350 from Terrascience Systems Limited of Vancouver, British Columbia, Canada.

However, in the preferred embodiment of applicant's invention, an operator attaches pressure measuring devices such as 110, 112, 114, and 116 to the vehicle wheel brake hoses, and then connects the associated electric lines to the diagnostic computer 118. The operator then presses the brake pedal 22 to provide braking pressure and operates the switch 140, whereupon the computer control module 58 executes a pre-programmed diagnostic routine to operate the associated valves in a predetermined sequence. During this time, the diagnostic computer 118 is in communication with the control module 58 and monitors the pressure changes in the associated wheel brake hoses to determine whether or not the anti-skid braking system is functioning properly.

Figure 3:
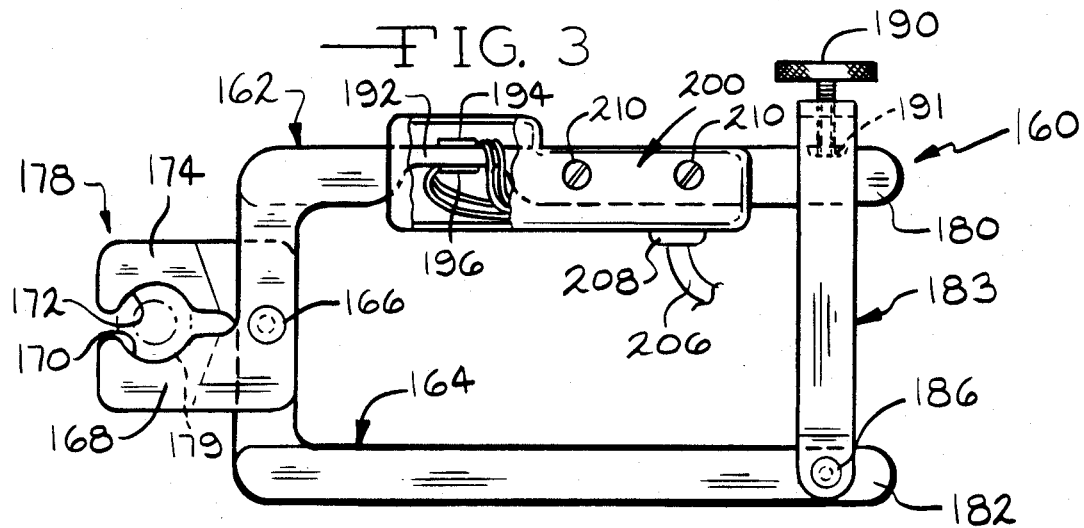
FIG. 3 is a side elevational view of the pressure measuring device shown in FIG. 2.
Figure 4:
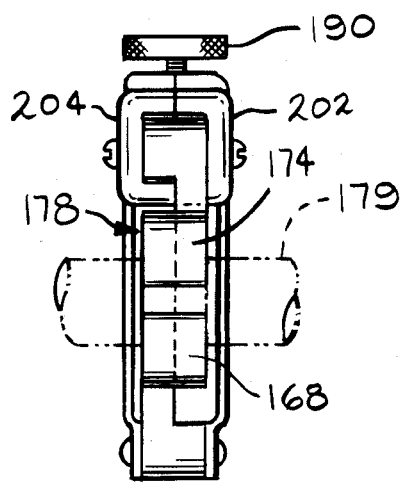
FIG. 4 is a front elevational view of the pressure measuring device shown in FIG. 3.
Figure 5:
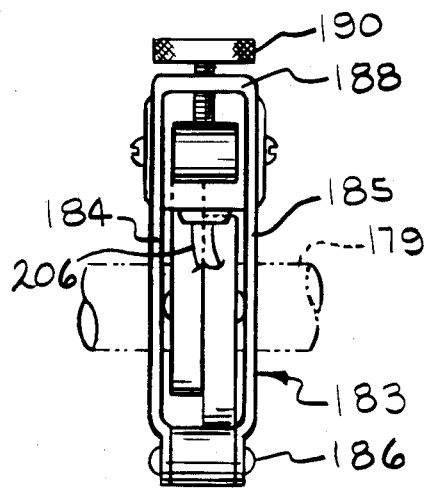
FIG. 5 is a rear elevational view of the pressure measuring device shown in FIG. 3.

Turning now to FIGS. 2 through 5, there are shown top, side, front and rear elevational views of a first preferred embodiment of a pressure sensing device 160 according to the invention. The sensing device 160 includes first and second arm members 162 and 164 hinged together at an intermediate pivot point 166. As illustrated in FIG. 3, a first end 168 of the arm member 162 is provided with an arcuate recess 170 in facing relationship with an arcuate recess 172 formed in a first end 174 of the arm member 164 to define a clamping means 178 for engaging an exterior sidewall of a fluid carrying conduit 179 (shown in phantom). If desired, the recesses 170 and 172 can be provided with serrated surfaces.

The arm members 162 and 164 include second ends 180 and 182 respectively which are restrained from relative movement away from one another by a U-shaped clamp assembly 183. The clamp assembly has a pair of spaced apart legs 184 and 185 (shown in FIG. 5) having lower ends pivotally attached to the second end 182 of the arm member 164 by a pin 186, and an upper connecting portion 188 having an adjusting screw 190 threaded therethrough. The screw 190 engages a recessed portion 191 formed in the upper surface of the second end 180 of the arm member 162 to resist movement of the second ends of the arm members away from one another. The adjusting screw 190 can be used to adjust the clamping force of the clamping means 178 on the conduit 179. Also, as will be appreciated, the screw 190 can be used to initialize the strain gauge reading prior to any pressurization of the conduit 179. It will be appreciated that the clamping assembly 183 may, if desired, be replaced with an overcenter type locking device.

In the embodiment illustrated, an intermediate portion of the arm member 162 is suitably thinned at the area 192 so that it will be subjected to stress in a desired amount when pressure within the fluid-carrying conduit 179 causes the arcuate recesses 170 and 172 to separate from each other. At the area 192, one or more strain responsive devices such as strain gauges 194 and 196 are adhesively attached in a conventional manner. Thus, as pressure in the fluid-carrying conduit 179 changes, the diameter of the conduit changes, and the stress applied to the thinned area 192 will vary as will the resistance of the strain gauges 194 and 196, causing an electrical indication of the pressure changes in the conduit. The number of such strain gauges, as well as the specific types, is based on the stress-strain relationship of the thinned area 192, and whether or not the remainder of a strain gauge bridge circuit is expected to be at the same temperature as the measuring device 160.

To protect the strain gauges 194 and 196, and to protect the junction (not shown) between the small wires to which they attach and the larger interconnecting wires, a cover 200 is provided. As will be apparent, such a cover may be omitted, or the strain gauges and their interconnecting wires may be covered and protected with any one of a number of rubber-like compounds applied in liquid form and allowed to harden, with or without the assistance of a mold to form it into a desired shape. As illustrated, the cover 200 is a split cover with cover halves 202 and 204 which cover the strain gauges 194 and 196 and their interconnections to a cable 206. A grommet 208 can be secured between the cover halves 202 and 204 to provide strain relief for the cable 206. The cover halves 202 and 204 are attached to the arm member 162 such as by screws 210.

Figure 6:
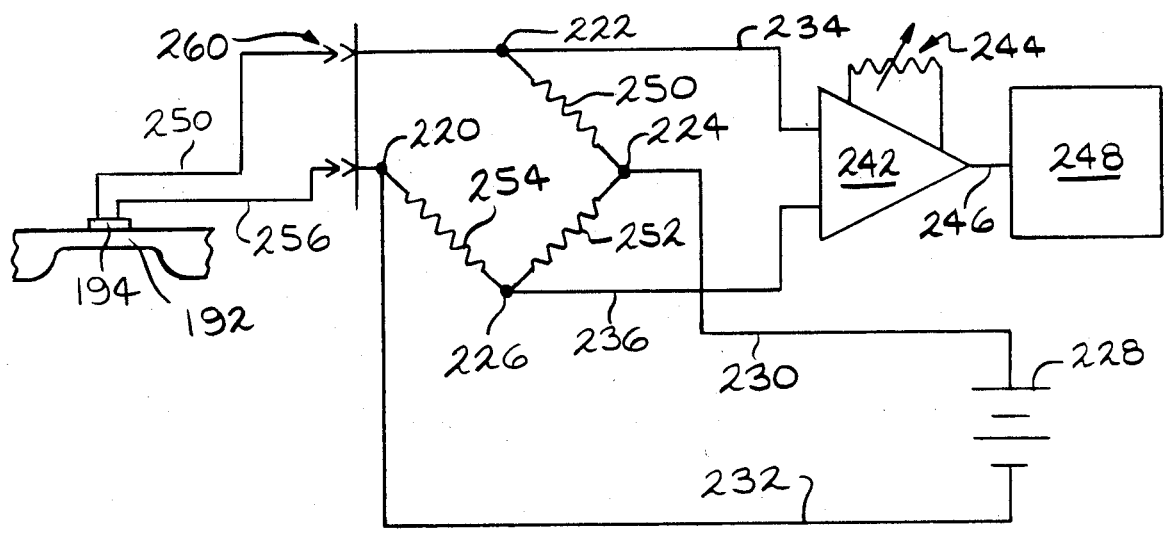
FIG. 6 is a schematic of an electrical circuit utilized when the pressure measuring device of FIGS. 2 through 5 has a single strain gauge mounted thereon.
Figure 7:
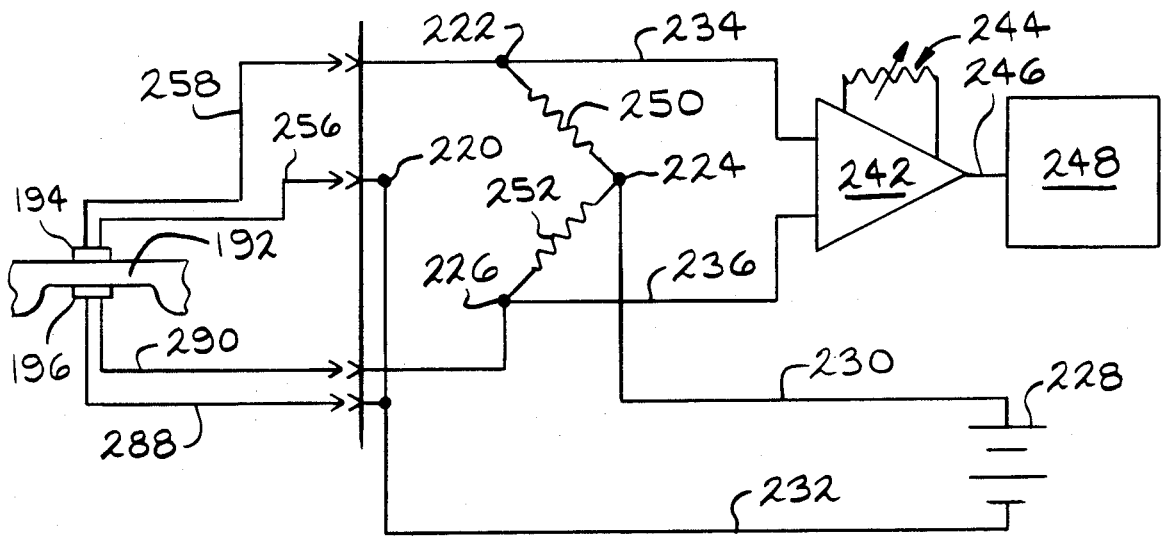
FIG. 7 is similar to FIG. 6, but shows a circuit which is utilized when two strain gauges are mounted to the pressure measuring device.
Figure 8:
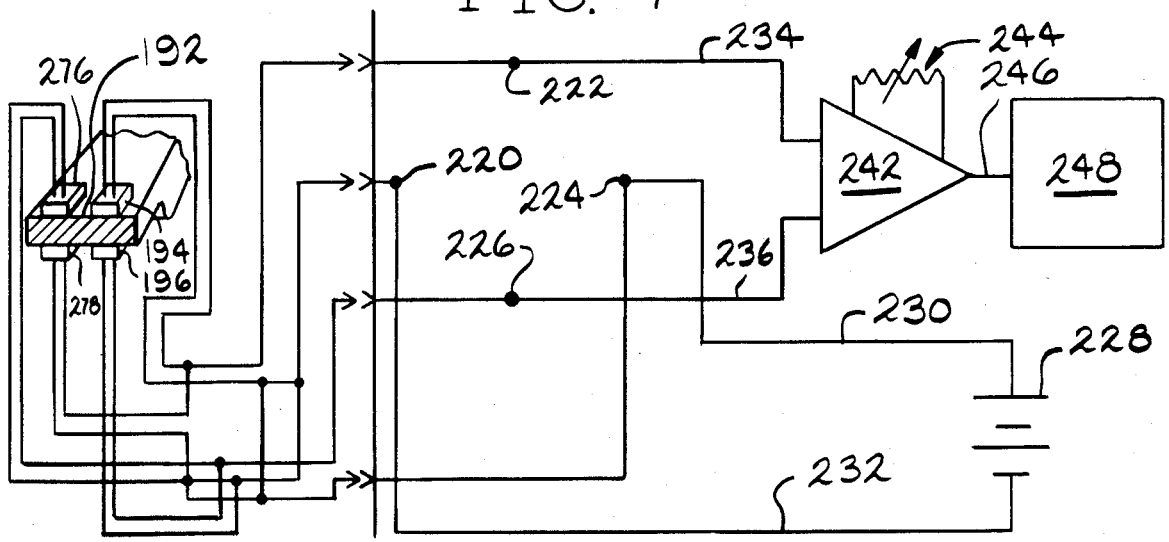
FIG. 8 is similar to FIGS. 6 and 7, but shows a circuit which is utilized when four strain gauges are mounted to the pressure measuring device.

FIGS. 6, 7, and 8 illustrate various configurations of strain responsive elements that may be used in conjunction with the measuring device of FIGS. 2 through 5, together with a schematic circuit illustrating the manner in which the resulting pressure-related indication may be monitored.

Strain gauges and the like are typically used in a four arm Wheatstone bridge configuration and form either one, two, or four arms of the bridge, with any remaining arms being filled by resistors. A two-active-arm bridge provides twice as much output per unit strain as a single-active-arm bridge, while a four-active-arm bridge provides temperature compensation in addition to increased output over the two-active-arm bridge.

Referring first to FIG. 6, a Wheatstone bridge configuration includes four terminals, identified as terminals 220, 222, 224, and 226 between which resistor arms are connected. A power source such as a battery 228 is connected by lines 230 and 232 to supply power across the terminals 224 and 220. The power source may provide either alternating or direct current. The output signal is derived between the terminals 222 and 226 and is connected by lines 234 and 236 as inputs to an amplifier 242.

The amplifier 242 includes compensation means 244 intended to be manually adjusted for the gauge factor of the strain gauges to be used. Strain gauges are typically of a resistive nature and the gauge factor is the relationship between the change of resistance and the change of size due to strain. The amplifier 242 may also include adjustment means (not shown) for balance or zeroing and gain or span. The amplifier 242 has an output line 246 connected to a readout unit 248. The readout unit 248 in a laboratory application might be galvanometer. A more rugged device would be a moving-pointer meter or a digital indicator. In the preferred embodiment of the invention, the readout unit 248 is either the digital display of a hand-held measuring unit, or the input section of the diagnostic computer shown in FIG. 1; or it may be a recorder of which there are numerous designs.

In FIG. 6, three legs of a Wheatstone bridge arrangement are formed by active resistors 250, 252, and 254, and a strain gauge 194 forming the fourth leg. The resistor 250 is connected between the terminals 222 and 224, the resistor 252 is connected between the terminals 224 and 226, and the resistor 254 is connected between the terminals 226 and 220. The strain gauge 194, which is located on the upper surface of the thinned portion 192 of the arm 162, is connected between the terminals 220 and 222 by lines 256 and 258 and a suitable connector means 260.

The resistance of the resistors 250, 252, and 254, along with the resistance of the strain gauge 194, are nominally but not always alike. Thus, when the strain gauge 194 is unstressed, equal current will flow from the terminal 224 to the terminal 220 through the series combination of the resistors 252 and 254, and through the series combination of the resistor 250 and/or the strain gauge 194, so that the terminals 222 and 226 will be at an equal potential. When the strain gauge 194 is placed in tension (when the conduit 179 expands), its resistance is increased, and the voltage at the terminal 222 will become closer to the voltage applied to the terminal 224. Should the strain gauge 194 be compressed (when the conduit 179 contracts), its resistance is lowered, and the voltage at the terminal 222 will shift and become closer to the voltage applied to the terminal 220. While not shown in the drawings, typically a junction block is provided adjacent the strain gauge 194 for facilitating interconnection between the small lead lines from the strain gauge and the larger lines 256 and 258.

Referring now to FIG. 7, there is shown a circuit schematic of a two-active-arm Wheatstone bridge which differs from that shown in FIG. 6 in that the resistor 254 has been eliminated and replaced by a second active arm shown as the strain gauge 196 which is located on the bottom of the thinned portion 192 immediately below the strain gauge 194. The strain gauge is connected to the terminals 220 and 226 by lines 288 and 290 respectively through a suitable connector.

In the configuration shown in FIG. 7, when the conduit 179 expands, the strain gauge 194 is in tension and the strain gauge 196 is in compression. Thus, the resistance of the strain gauge 194 will increase while the resistance of the strain gauge 196 will decrease, so that the voltage difference between terminals 222 and 226 will be approximately twice what was produced by the arrangement of FIG. 6.

The arrangement shown in FIG. 8 provides that all arms of the Wheatstone bridge are at the same temperature. The additional precision provided by this method of overcoming minor differences in temperature coefficients of resistance provides more accurate pressure readings.

In FIG. 8, strain gauges shown as the strain gauges 194 and 196 are attached to the thinned portion 192 and connected to the Wheatstone bridge in a manner similar to FIG. 7. Thus, the strain gauge 194 is connected between the Wheatstone bridge terminals 220 and 222, and at the strain gauge 196 is connected between the Wheatstone bridge terminals 220 and 226 so that the voltage difference between the terminals 222 and 226 as a result of the gauges 194 and 196 will be similar to that of of FIG. 7. In addition, two additional strain gauges, identified as gauges 276 and 278, have been substituted for resistors 250 and 252 shown in FIG. 7, and are attached to upper and lower surfaces of the thinned portion 192. Thus, the strain gauge 276 is connected between the Wheatstone bridge terminals 222 and 224, while the gauge 278 is connected between the terminals 224 and 226. The strain gauges 276 and 278 function to further increase the output of the Wheatstone bridge. The strain gauge 276 operates in a manner similar to the gauge 194, while the gauge 196 operates in a manner similar to the gauge 196. The individual jumpers between the various strain gauges in FIG. 8 are not numbered for clarity, since the interconnection of the strain gauges is well known to those skilled in the art.

Figure 9:
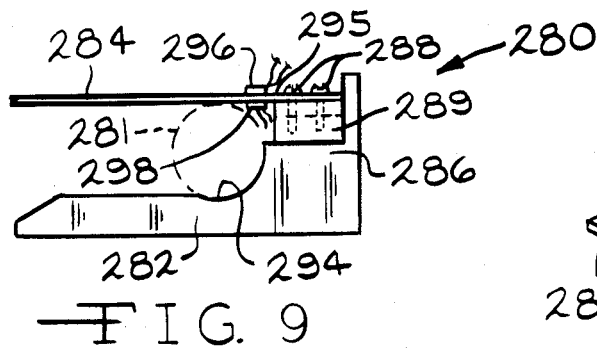
FIG. 9 is a side elevational view of a second preferred embodiment of a pressure measuring device according to the invention.
Figure 10:
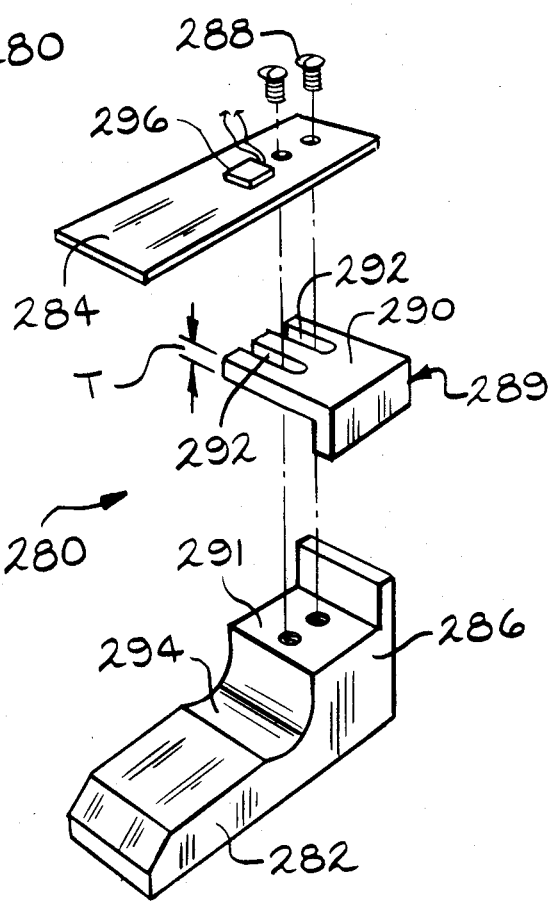
FIG. 10 is an exploded perspective view of the pressure measurement device shown in FIG. 9, illustrating the positioning of a spacer.

Turning now to FIGS. 9 and 10, there is shown a second preferred embodiment of a pressure measuring device 280 according to the present invention. The pressure measuring device 280 is generally in the form of a U-shaped clamp adapted to be slipped over an associated fluid-carrying conduit 281.

More specifically, the measuring device 280 includes a lower rigid leg member 282 which can be constructed of aluminum, for example, and an upper deflectable leg member 284 which can be stainless spring steel having a thickness of approximately 0.012 inches. The lower leg member 282 has one end provided with an integral, upwardly extending support portion 286 which is securely attached to the inner end of the leg member 284 by screws 288. In the embodiment shown in FIGS. 9 and 10, an L-shaped spacer element 289, having a main leg 290 formed of a thickness T, is inserted between an upper surface 291 of the support portion 286 and the bottom surface at the inner end of the flexible leg 284. The spacer 289 is provided with slots 292 through which the screws 288 pass. The lower leg 282 is provided with an arcuate portion 294 for receiving the conduit 281. The thickness T of the spacer element 290 is selected such that, when the conduit 281 is placed in the recessed portion 294 between the legs 282 and 284, the leg 284 will be at least slightly deflected upwardly about a pivot area 295 when the fluid within the line 281 is not pressurized. As shown in FIGS. 9 and 10, a strain gauge 296 is secured to the upper surface of the leg 284 adjacent the pivot area 295, while a second strain gauge 298 is secured to the lower surface of the leg 284 immediately below the strain gauge 294. If desired, additional strain gauges can be located in this region to increase the sensitivity of the measuring device.

Figure 11:
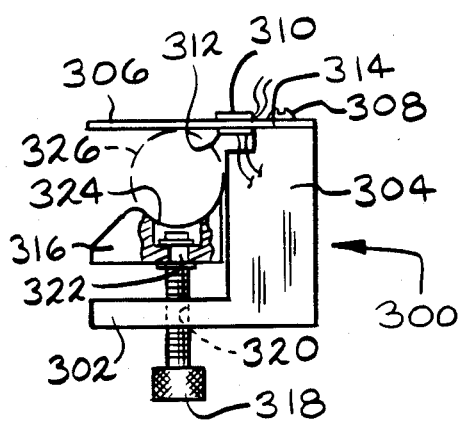
FIG. 11 shows a third preferred embodiment of a pressure measuring device, similar to the embodiment of FIGS. 9 and 10, but having a manually adjustable clamp to enable the device to be attached to fluid-carrying lines of different outside diameters.

Referring to FIG. 11, there is shown a third alternate preferred embodiment a measuring device 300 according to the present invention. The measuring device 300 is similar in operation to the embodiment shown in FIGS. 9 and 10, except that the adjustment provided by means of spacer element 289 in FIG. 9 is now performed by means of a movable conduit seat adjustably mounted on the lower leg. In particular, the measuring device 300 includes a lower leg 302 having an upwardly extending support portion 304 at one end which is secured to the inner end of a defleatable leg member 306 by means of screws 308. Strain gauges 310 and 312 are secured to the upper and lower surfaces of the leg 306 adjacent its pivot area 314.

The measuring device 300 is provided with a moveable conduit seat 316 which is moveable toward and away from the deflectable leg 306 to accommodate conduits of varying diameters. The conduit seat 316 is moveable by means of an adjusting screw 318 threaded into an aperture 320 formed in the lower leg 302 and having an upper end 322 rotatably mounted with an aperture provided in the moveable conduit seat 316. The conduit seat 316 is provided with an arcuate portion 324 having a curvature generally conforming to the curvature of an associated fluid-carrying line 326.

Figure 12:
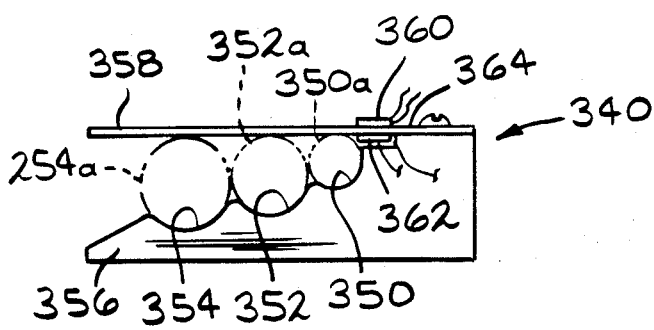
FIG. 12 is a side elevational view of a fourth embodiment of a pressure measuring device according to the invention, similar to the embodiment of FIGS. 9 and 10, but having a plurality of different-size transverse grooves to enable the device to be used with different sizes of fluid-carrying lines.

FIG. 12 shows a fourth preferred embodiment of a measuring device 340. The measure device in FIG. 12 is similar to that of FIGS. 9 and 10, except that the spacer element 290 has been eliminated, and the adjustment means for accommodating varying diameter conduits is provided by forming plurality of transversely extending, different size arcuate grooves 350, 352, and 354 in a lower rigid leg member 356 for receiving different size conduits 350a, 352a, and 354a respectively. A deflectable leg member 358 has one end secured to the leg member 356 and is provided with strain gauges 360 and 362 adjacent its pivot area 364.

The principle and mode of operation of the invention have been illustrated and described in what is considered to represent its preferred embodiments. However, it will be appreciated that the invention can be practiced otherwise than as specifically illustrated and described without departing from the scope of the attached claims.

What is claimed is:

1. A method of testing a vehicle anti-skid braking system wherein the braking system includes at least one valve means located in a brake fluid line for controlling the application of fluid pressure to a selected wheel brake, said method comprising the steps of:
    (a) sensing the fluid pressure in a portion of the brake line located between the valve means and the selected wheel brake;
    (b) supplying pressurized brake fluid to the selected wheel brake through the valve means;
    (c) operating the valve means in a predetermined sequence; and
    (d) simultaneously with step (c), monitoring the pressure sensed in step (a) to determine whether the anti-skid braking system is operable.

2. The method according to claim 1 wherein step (a) is performed by attaching a measuring device to an exterior portion of the brake line, said device being responsive to changes in dimension in the exterior portion of the brake line, the exterior dimension being representative of the fluid pressure in said portion of the brake line.

3. The method according to claim 2 wherein step (a) is performed with said measuring device isolated from direct contact with the brake fluid.

4. The method according to claim 3 wherein step (a) includes the step of releasably attaching said measuring device to the brake line.

5. The method according to claim 4 wherein the vehicle anti-skid braking system includes a plurality of valve means for controlling the application of fluid pressure to a plurality of selected wheel brakes, and wherein step (a) includes the step of releasably attaching a separate measuring device between each of said valve means a selected wheel brake.

6. The method according to claim 1 wherein the anti-skid brake system includes a flexible brake hose connected between a metallic brake line and the selected wheel brake, and step (a) includes the step of attaching a measuring device to the flexible brake hose.

7. The method according to claim 1 wherein step (b) is performed by depressing a vehicle brake pedal.

8. The method according to claim 1 wherein the vehicle anti-skid braking system includes a central control unit for operating the valve means, and said method includes, prior to step (c), the step of programming a predetermined diagnostic routine in the central control unit and step (c) includes the step of operating said diagnostic routine to operate the valve means in said predetermined sequence.

9. The method according to claim 8 including, prior to step (a), the step of coupling a diagnostic computer to the central control unit, and step (d) includes the step of monitoring the pressure sensed in step (a) with the diagnostic computer to determine whether the anti-skid braking system is operable.

10. The method according to claim 9 wherein step (a) includes the step of releasably attaching a measuring device to the conduit.

* * * * *